United States Patent
Thai

(10) Patent No.: US 9,479,397 B1
(45) Date of Patent: Oct. 25, 2016

(54) METHODS AND APPARATUS FOR AUTOMATIC CONFIGURATION OF VIRTUAL LOCAL AREA NETWORK ON A SWITCH DEVICE

(71) Applicant: Juniper Networks, Inc., Sunnyvale, CA (US)

(72) Inventor: Chris Thai, Oakland, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 2 days.

(21) Appl. No.: 14/543,416

(22) Filed: Nov. 17, 2014

Related U.S. Application Data

(63) Continuation of application No. 13/415,455, filed on Mar. 8, 2012, now Pat. No. 8,892,696.

(51) Int. Cl.
| | |
|---|---|
| *H04L 12/28* | (2006.01) |
| *H04L 12/721* | (2013.01) |
| *H04L 12/54* | (2013.01) |
| *H04L 12/771* | (2013.01) |
| *H04L 12/24* | (2006.01) |
| *H04L 12/931* | (2013.01) |
| *H04L 29/06* | (2006.01) |
| *H04L 12/46* | (2006.01) |
| *H04L 12/753* | (2013.01) |

(52) U.S. Cl.
CPC ......... *H04L 41/0886* (2013.01); *H04L 12/467* (2013.01); *H04L 12/4679* (2013.01); *H04L 45/48* (2013.01); *H04L 49/354* (2013.01); *H04L 63/08* (2013.01)

(58) Field of Classification Search
CPC . H04L 12/467; H04L 12/4679; H04L 45/48; H04L 49/354; H04L 63/08
See application file for complete search history.

(56) References Cited

U.S. PATENT DOCUMENTS

| | | | | |
|---|---|---|---|---|
| 5,878,232 | A * | 3/1999 | Marimuthu | H04L 45/48 709/224 |
| 5,905,725 | A * | 5/1999 | Sindhu | H04L 12/56 370/389 |
| 6,381,239 | B1 * | 4/2002 | Atkinson | H04M 3/005 370/362 |
| 6,813,250 | B1 | 11/2004 | Fine et al. | |
| 6,873,602 | B1 | 3/2005 | Ambe | |
| 7,055,171 | B1 | 5/2006 | Martin et al. | |

(Continued)

OTHER PUBLICATIONS

Office Action for U.S. Appl. No. 13/415,455, mailed on Jul. 10, 2013.

(Continued)

*Primary Examiner* — Nicholas Taylor
*Assistant Examiner* — Ho Shiu
(74) *Attorney, Agent, or Firm* — Cooley LLP

(57) ABSTRACT

An apparatus includes a switch that has a module implemented in at least one of a processor or a memory, and multiple ports including a first port and a second port in a predefined sequence relative to the first port. The module is configured to automatically associate a first compute device with a first virtual local area network (VLAN) when the first compute device is coupled to the first port with a first cable. The module is configured to automatically associate a second compute device to the first VLAN when the second compute device is coupled to the second port with a second cable based on the second port being in a predefined sequence relative to the first port. The predefined sequence can include, for example, the second port being next in physical sequence after the first port.

20 Claims, 12 Drawing Sheets

(56) References Cited

U.S. PATENT DOCUMENTS

| | | | |
|---|---|---|---|
| 7,406,076 B2 | 7/2008 | Katoh | |
| 7,869,394 B1 | 1/2011 | Boden, Jr. et al. | |
| 7,983,258 B1 | 7/2011 | Ruben et al. | |
| 8,892,696 B1 | 11/2014 | Thai | |
| 9,130,835 B1* | 9/2015 | White | H04L 41/0806 |
| 2003/0189905 A1 | 10/2003 | Lee | |
| 2004/0213211 A1* | 10/2004 | Green | H04L 12/2801 370/352 |
| 2005/0076143 A1 | 4/2005 | Wang et al. | |
| 2006/0021043 A1 | 1/2006 | Kaneko et al. | |
| 2006/0023724 A1 | 2/2006 | Na et al. | |
| 2006/0062187 A1 | 3/2006 | Rune | |
| 2006/0072594 A1 | 4/2006 | Swamy | |
| 2006/0274674 A1 | 12/2006 | Okita et al. | |
| 2007/0230457 A1* | 10/2007 | Kodera | H04L 12/4679 370/389 |
| 2007/0291665 A1 | 12/2007 | Hauenstein et al. | |
| 2008/0056161 A1 | 3/2008 | Okita et al. | |
| 2008/0222285 A1 | 9/2008 | Hickey et al. | |
| 2009/0204705 A1 | 8/2009 | Marinov et al. | |
| 2010/0040068 A1 | 2/2010 | Wimmer | |
| 2010/0061394 A1* | 3/2010 | Sindhu | H04L 49/1515 370/422 |
| 2011/0069712 A1 | 3/2011 | Koch et al. | |
| 2012/0054358 A1 | 3/2012 | Yamada | |
| 2012/0054830 A1 | 3/2012 | Yamada | |
| 2012/0082063 A1 | 4/2012 | Fujita | |
| 2012/0233657 A1 | 9/2012 | Guevin et al. | |
| 2012/0290853 A1* | 11/2012 | He | G06F 11/325 713/300 |
| 2012/0320913 A1* | 12/2012 | Vicat-Blanc Primet | H04L 45/00 370/389 |
| 2013/0232251 A1* | 9/2013 | Pauley | H04L 63/306 709/224 |

OTHER PUBLICATIONS

Final Office Action for U.S. Appl. No. 13/415,455, mailed on Jan. 22, 2014.

* cited by examiner

Switch Configuration Table
332

| Port ID | Compute Device | VLAN ID |
|---|---|---|
| P1 | C1 | VLAN1 |
| P2 | C2 | VLAN1 |
| P3 | C3 | VLAN1 |
| P4 | | |
| P5 | C5 | VLAN2 |
| P6 | C4 | VLAN3 |
| P7 | C6 | VLAN3 |
| P8 | | |
| P9 | C7 | VLAN4 |
| P10 | C8 | VLAN4 |
| P11 | | |
| P12 | C9 | VLAN5 |

FIG. 11

| Switch Configuration Table 432 | | |
|---|---|---|
| Port ID | Compute Device | VLAN ID |
| P1 | C1 | VLAN1 |
| P2 | C2 | VLAN1 |
| P3 | | |
| P4 | C3 | VLAN2 |
| P5 | C4 | VLAN2 |
| P6 | C5 | VLAN1 |

| Switch Configuration Table 532 ||||
| Port ID | Compute Device | Time Period | VLAN ID |
| --- | --- | --- | --- |
| P1 | C1 | T1 | VLAN1 |
| P2 | C2 | T2 | VLAN2 |
| P3 | | | |
| P4 | C3 | T2 | VLAN2 |
| P5 | C4 | T1 | VLAN1 |
| P6 | C5 | T1 | VLAN1 |

VLAN Assignment Table
634

| Port ID | VLAN ID |
|---------|---------|
| P1 | VLAN1 |
| P2 | VLAN1 |
| P3 | VLAN1 |
| P4 | VLAN2 |
| P5 | VLAN2 |
| P6 | VLAN1 |

METHODS AND APPARATUS FOR AUTOMATIC CONFIGURATION OF VIRTUAL LOCAL AREA NETWORK ON A SWITCH DEVICE

CROSS-REFERENCE TO RELATED APPLICATIONS

This application is a continuation of U.S. patent application Ser. No. 13/415,455, entitled "Methods and Apparatus for Automatic Configuration of Virtual Local Area Network on a Switch Device," filed Mar. 8, 2012, the disclosure of which is incorporated herein by reference in its entirety.

BACKGROUND

Some embodiments described herein relate generally to a switch device, and, in particular, to methods and apparatus for automatic configuration of virtual local area networks on compute devices coupled to a switch device.

Some known switches or switch devices used in a network including multiple virtual local area networks (VLANs) can require manual installation and setup by an administrator to configure compute devices of the network to operate within a particular or selected VLAN of the network. For example, when a compute device is added to a port of a switch device of such a network, the administrator of the network may need to use a command line interface (CLI) or a graphical user interface (GUI) to key-in or otherwise manually configure that compute device. Such manual installation procedures can be time consuming and increase the costs associated with configuring compute devices to work within a VLAN of such a network.

Accordingly, a need exists for the ability to provide automatic configuration of virtual local area networks on compute devices coupled to a switch device.

SUMMARY

An apparatus includes a switch that has a module implemented in at least one of a processor or a memory, and multiple ports including a first port and a second port in a predefined sequence relative to the first port. The module is configured to automatically associate a first compute device with a first virtual local area network (VLAN) when the first compute device is coupled to the first port with a first cable. The module is configured to automatically associate a second compute device to the first VLAN when the second compute device is coupled to the second port with a second cable based on the second port being next in the predefined sequence relative to the first port. The predefined sequence can include, for example, the second port being next in physical sequence after the first port.

BRIEF DESCRIPTION OF THE DRAWINGS

FIG. 11 is an illustration of a switch configuration table associated with the switch devices and compute devices of FIG. 10.

FIG. 16 is an illustration of a VLAN assignment table associated with a switch device, according to an embodiment.

DETAILED DESCRIPTION

Figure 1:
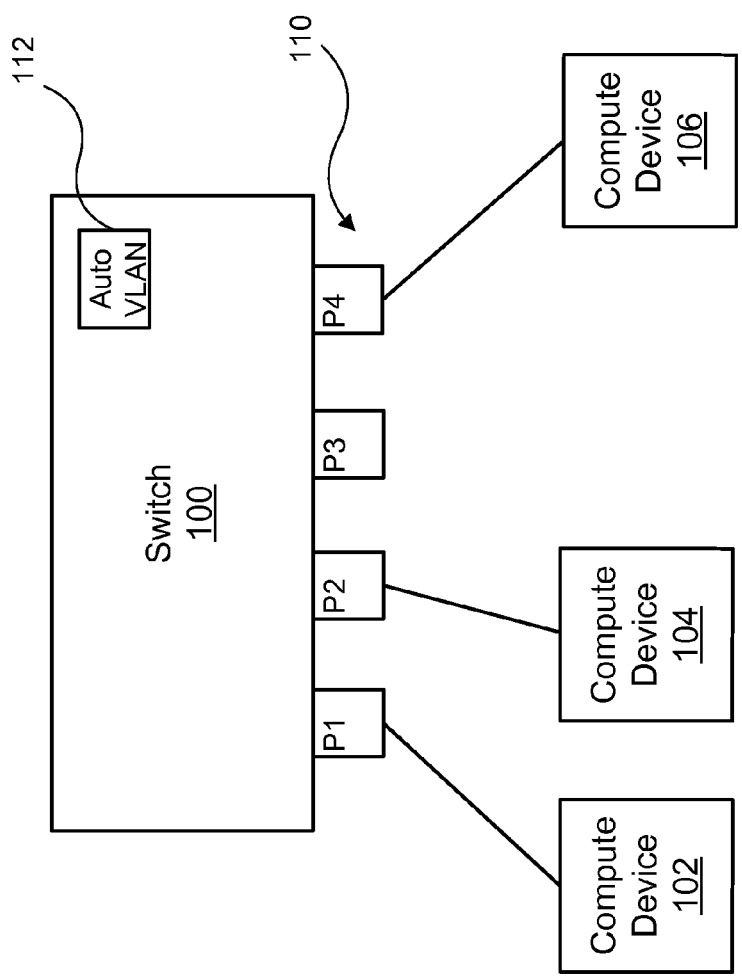
FIG. 1 is a schematic illustration of a switch device according to an embodiment, and multiple compute devices coupled to the switch device.

Systems, apparatus and methods are described herein to provide automatic configuration of one or more virtual local area networks (VLANs) on one or more compute devices coupled to a switch device. For example, in a network including multiple VLANs, a switch device as described herein can be used to associate multiple compute devices with various VLANS of the network and can automatically configure the compute devices to operate within one or more VLANs of the network. For example, when a compute device is coupled to a port of the switch device using, for example, a connector for an optical fiber cable, the switch device can automatically configure the compute device to operate within a specific VLAN of the network.

In some embodiments, an apparatus includes a switch that has a module implemented in at least one of a processor or a memory, and multiple ports including a first port and a second port in a predefined sequence relative to the first port. The module is configured to automatically associate a first compute device with a first virtual local area network (VLAN) when the first compute device is coupled to the first port with a first cable. The module is configured to automatically associate a second compute device to the first VLAN when the second compute device is coupled to the second port with a second cable based on the second port being in the predefined sequence relative to the first port. The automatically associating the first VLAN with the first compute device and the second VLAN with the second compute device can include configuring the first compute device to operate within the first VLAN, and configuring the second compute device to operate within the first VLAN. The predefined sequence can include, for example, the second port being directly in sequence after the first port.

In some embodiments, a method includes receiving a first cable at a first port of a switch that includes multiple ports in a sequence including the first port and a second port. A first virtual local area network is associated with a first compute device coupled to the first cable. A second cable is received at a second port from the multiple ports of the switch, and the second port is directly in sequence after the first port. The first VLAN is automatically associated with a second compute device coupled to the second cable at the second port based on the second port being directly in sequence after the first port.

In some embodiments, a non-transitory processor-readable medium storing code representing instructions to be executed by a processor includes code to cause the processor to receive an indication of a first cable coupled at a first port of a switch that includes multiple ports. A first VLAN is automatically associated with a first compute device coupled to the first cable. An indication of a second cable coupled at a second port of the switch is received and the second port is in a predefined sequence after the first port of the switch. The first VLAN is automatically associated with a second compute device coupled to the second cable at the second port based on the second port being in the predefined sequence after the first port.

In some embodiments, a method includes receiving during a first time period a first cable at a first port of a switch that includes multiple ports. The multiple ports include the first port and a second port. A first VLAN is associated with a first compute device coupled to the first cable based on the first cable being received during the first time period. A second cable is received at the second port of the switch during a second time period different than the first time period. A second compute device coupled to the second cable is automatically associated with a second VLAN different than the first VLAN based on the second cable being received during the second time period.

As used herein, "associated with" can mean, for example, included in, physically located with, a part of, and/or operates or functions as a part of. For example, a compute device associated with a port of a switch can be said to be coupled to the port of the switch. A VLAN associated with a compute device can also be said to operate or function as a part of the compute device. Additionally, "associated with" can mean, for example, references, identifies, characterizes, describes, and/or sent from. For example, a VLAN associated with a compute device coupled to a cable coupled to a port of a switch can be a VLAN that identifies, references and/or relates to the compute device.

As used in this specification, the singular forms "a," "an" and "the" include plural referents unless the context clearly dictates otherwise. Thus, for example, the term "a compute device" is intended to mean a single compute device a combination of compute devices.

FIG. 1 is a schematic illustration of a switch device according to an embodiment and multiple compute devices coupled to the switch device. A switch device 100 (also referred to herein as "switch") includes multiple ports 110 (P1, P2, P3, P4) that can be, for example, Ethernet ports that can receive a connector of a cable, such as, for example, a cable having an optical fiber. In other words, the ports 110 as described herein are physical ports of the switch device 100. Although the switch 100 includes four ports 110 illustrated in FIG. 1, in alternative embodiments, the switch 100 can include more or less ports 110. For example, in some embodiments, a switch 100 can include 8 ports, 10 ports, 24 ports, 48 ports, or any number of ports. The ports 110 can be identified on the switch 100 in a sequential manner. For example, ports P1, P2, P3, and P4 can be said to be located or positioned in a sequence, with port P1 being first in the sequence, port P2 being second in the sequence, port P3 being third in the sequence and port P4 being fourth in the sequence.

The switch 100 can control and operate a computer network or system that includes multiple VLANs, and can control the operation of the VLANs on compute devices 102, 104, and 106 coupled to the switch 100. For example, the switch 100 can control and enforce the configuration and rules associated with one or more VLANs of the computer network and how the multiple compute devices 102, 104, 106 and 108 are associated with and operate within such VLANS of the computer network or system. Although four compute devices are illustrated in FIG. 1, it should be understood that such a compute system can include more or less compute devices. The compute devices 102, 104, 106 can each be coupled to a selected port 110 (P1, P2, P3, P4) of the switch 100 with, for example, a cable with a connector such as, a connector of an optical fiber cable. The compute devices 102, 104, and 106 can be, for example, a personal computer, a laptop computer, a personal digital assistant (PDA), a cellular telephone, a portable/mobile internet device and/or some other electronic communications device.

The switch 100 can also include an Auto VLAN actuator 112 that can be used to turn on and off an automatic VLAN configuration mode as described in more detail below. In some embodiments, the switch 100 can, in addition to or alternatively, include VLAN designation actuators (not shown in FIG. 1) that can be used to designate which VLAN a compute device (e.g., 102, 104, 106) is to operate upon coupling the compute device to a port 110 of the switch 100. For example, when a compute device is coupled to a port 110 of the switch 100, the particular VLAN to which the compute device is to be configured to operate will depend on which VLAN designation actuator has been actuated. Such an embodiment is described in more detail below. In another alternative embodiment, the switch can include an Auto VLAN Time Mode actuator (not shown in FIG. 1) that can be used to designate which VLAN a compute device (e.g., 102, 104, 106) is to operate within based on a time period during which the compute device is coupled to a port of the switch. An embodiment of such a switch is described in more detail below. The Auto VLAN actuator, the VLAN designation actuators, and the Auto VLAN Time Mode actuator can each be, for example, a button, a touch screen icon, a toggle switch, etc.

Figure 2:
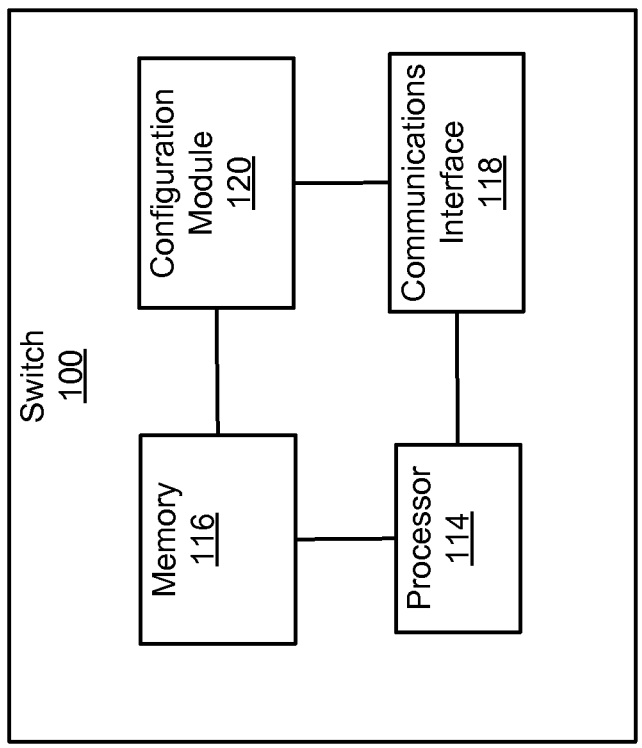
FIG. 2 is a schematic illustration of a switch device, according to an embodiment.

As shown in FIG. 2, the switch 100 can include a processor 114, a memory 116, a communications interface 118 and a configuration module 120. The switch 100 can include a combination of hardware modules and software modules. Processor 114 can be operatively coupled to memory 116 and communications interface 118. Communications interface 118 can be one or more wired and/or wireless data connections, such as connections conforming to one or more known information exchange standards, such as wired Ethernet, wireless 802.11x ("Wi-Fi"), high-speed packet access ("HSPA"), worldwide interoperability for microwave access ("WiMAX"), wireless local area network ("WLAN"), Ultra-wideband ("UWB"), Universal Serial Bus ("USB"), Bluetooth®, infrared, Code Division Multiple Access ("CDMA"), Time Division Multiple Access ("TDMA"), Global Systems for Mobile Communications ("GSM"), Long Term Evolution ("LTE"), broadband, fiber optics, telephony, and/or the like.

Memory 116 can be, for example, a read-only memory ("ROM"); a random-access memory ("RAM") such as, for example, a magnetic disk drive, and/or solid-state RAM such as static RAM ("SRAM") or dynamic RAM ("DRAM"); and/or FLASH memory or a solid-data disk ("SSD"). In some embodiments, a memory can be a combination of memories. For example, a memory can include a DRAM cache coupled to a magnetic disk drive and an SSD.

The processor 114 can be any of a variety of processors. Such processors can be implemented, for example, as hardware modules such as embedded microprocessors, Application-Specific Integrated Circuits ("ASICs"), and Programmable Logic Devices ("PLDs"). Some such processors can have multiple instruction executing units or cores. Such processors can also be implemented as one or more software modules in programming languages such as, for example, Java™, C++, C, assembly, a hardware description language, or any other suitable programming language. A processor according to some embodiments includes media and computer code (also can be referred to as code) specially designed and constructed for the specific purpose or purposes. In some embodiments, the processor 114 can support standard HTML, and software languages such as, for example, JavaScript, JavaScript Object Notation (JSON), Asynchronous JavaScript (AJAX).

In some embodiments, the processor 114 can be, for example, a single physical processor such as a general-purpose processor, an ASIC, a PLD, or a FPGA having a single processing core or a group of processing cores. Alternatively, the processor 114 can be a group or cluster of processors such as a group of physical processors operatively coupled to a shared clock or synchronization signal, a shared memory, a shared memory bus, and/or a shared data bus. In other words, a processor can be a group of processors in a multi-processor computing device. In yet other alternatives, the processor 114 can be a group of distributed processors (e.g., computing devices with one or more physical processors) operatively coupled one to another via a separate communications network (not shown). Thus, a processor can be a group of distributed processors in communication one with another via a communications network. In some embodiments, a processor can be a combination of such processors. For example, a processor can be a group of distributed computing devices, where each computing device includes a group of physical processors sharing a memory bus and each physical processor includes a group of processing cores.

The configuration module 120 (shown in FIG. 2) can be any valid combination of hardware and/or software (executing on hardware and/or stored in memory) and configured to automatically configure a compute device (e.g., compute devices 102, 104, 106) to operate within a particular VLAN controlled and operated by the switch 100. The configuration module 120 can be implemented in the memory 116 and/or the processor 114. For example, the configuration module 120 can automatically configure the compute device 102 to operate within a particular VLAN of the computer network or system controlled by the switch 100 when the compute device 102 is coupled to the port P1 (see e.g., FIG. 1) with a cable, such as, for example, a cable having an optical fiber. Similarly, the configuration module 120 can automatically configure the compute devices 104 and 106 to operate within a particular VLAN when each are coupled to the ports P2 and P4, respectively.

More specifically, the configuration module 120 can be configured to automatically configure a compute device (e.g., 102, 104, 106) to operate within a particular VLAN of the system operated and controlled by the switch 100 based on a predefined sequential location of the particular port to which the compute device (e.g., 102, 104, 106) is coupled in relation to the other ports of the switch, and whether a sequentially preceding port of the switch 100 has a compute device coupled thereto. For example, as shown in FIG. 1, when compute device 104 is coupled to port P2 of the switch 100, the compute device 104 will be associated with the same VLAN as the compute device 102 coupled to the port P1 because the port P2 is directly in sequence after the port P1 and the port P1 has the compute device 102 coupled thereto. When the compute device 106 is coupled to the port P4, as shown in FIG. 1, because the port P3 has no compute device coupled thereto, the compute device 106 will be associated with a different VLAN than the VLAN associated with the compute device 102 and the compute device 104. In other words, absence of a compute device coupled to the port P3 of the switch 100, causes the switch 100 to associate a different VLAN to the compute device 106 when coupled to the port P4. Said another way, the absence of a compute device coupled to a port 110 of the switch 100 defines a gap between ports 110 of the switch 100 that have a compute device coupled thereto. The gap between ports 110 can be a one-port gap (e.g., as shown in FIG. 1 between ports P2 and P4) or can include more than one port. For example, if both ports P2 and P3 had no compute device coupled thereto, a two-port gap would exist between ports P1 and P4.

When the configuration module 120 associates a compute device with a particular VLAN, the configuration module 120 can send a signal to that compute device such that the compute device will be configured to operate within that VLAN. In some embodiments, the configuration module 120 can automatically associate a VLAN with a compute device by sending to the compute device a VLAN ID associated with that VLAN.

In the above example, the configuration module 120 is configured to automatically configure the compute devices (102, 104, 106) to operate within a particular VLAN based on a predefined sequential order of the ports P1-P4 being directly next in physical sequence relative to each other. In other words, as described above, the port P1 is directly next in physical sequence relative to port P2, and port P3 is directly next in physical sequence after the port P2, and port P4 is directly next in physical sequence after port P3. In alternative embodiments, although the ports P1-P4 can be physically next in a direct sequence relative to each, the configuration module 120 can be configured to automatically configure a compute device (102, 104, 106) coupled to the switch 100 based on a different predefined sequence of connecting the compute devices to the switch 100.

For an example of such an alternative embodiment, the configuration module 120 can be configured to associate a compute device (102, 104, 106) coupled to the switch 100 (with ports P1, P2, P3, P4, P5 and P6 in a physical sequence) based on a predefined sequential order of even numbered ports of switch 100 and followed by odd numbered ports of switch 100. Following this example, when a first compute device is coupled to port P2, the first compute device can be associated with a first VLAN. When a second compute device is coupled to the port P4, the second compute device can also be associated with the first VLAN. If, instead, the second compute device is coupled to the port P6, the second compute device can be associated with a second VLAN different than the first VLAN, because port P4 does not have a compute device coupled thereto, and therefore, defines a port gap as described above in the predefined sequence of even numbered ports followed by odd numbered ports. Other predefined sequences can alternatively be used.

The switch 100 can in addition to, or alternatively, include VLAN designation actuators as described above. In such an embodiment, the configuration module 120 can automatically configure a compute device to operate within a particular VLAN based on which VLAN designation actuator has been actuated. For example, if the switch 100 has a first VLAN designation actuator and a second VLAN designation actuator, and the first VLAN designation actuator is actuated, when a compute device is coupled to a port of the switch that compute device will be configured to operate within the VLAN associated with the first VLAN designation actuator. If the second VLAN designation actuator is actuated, a compute device coupled to a port of the switch 100 will be configured to operate within the VLAN associated with the second VLAN designation actuator. In some embodiments, the VLAN designation actuators can be actuated prior to the compute device being coupled to a port. For example, a user can first actuate a first VLAN designation actuator and then when a compute device is coupled to a port of the switch 100, the compute device can be configured to operate within the VLAN associated with the first VLAN designation actuator. In some embodiments, the VLAN designation actuators can be actuated after a compute device has been coupled to a port. For example, a user can couple a compute device to a port of the switch 100 and then actuate one of the VLAN designation actuators to configure the compute device to operate within the VLAN associated with that particular VLAN designation actuator.

In alternative embodiments, the VLAN designation actuators can be predefined or preconfigured to be associated with one or more ports of the switch 100. For example, in such an embodiment, a user can predefine or pre-configure the VLAN designation actuators to be associated with particular ports of the switch prior to connecting any compute devices to the switch. For example, a first VLAN actuator can be configured to be associated with port P1 and port P3, and a second VLAN actuator can be configured to be associated with port P2 and port P4. After being preconfigured, when a compute device is coupled to the port P1 or port P3, the compute device will be automatically configured to operate within a VLAN associated with the first VLAN actuator. When a compute device is coupled to the port P2 or port P4, the compute device will be automatically configured to operate within a VLAN associated with the second VLAN actuator.

As described above, the switch 100 can in addition to, or alternatively, include an Auto VLAN Time Mode actuator, as described above. In such an embodiment, the configuration module 120 can automatically configure a compute device to operate within a particular VLAN based on the time period during which the compute device is coupled to a port of the switch. For example, a user can predefine or pre-configure the Auto VLAN actuator to include one or more time periods and associate various VLANs of the computer network or system with the predefined time periods prior to connecting any compute devices to the switch 100. After the Auto VLAN Time Mode actuator has been predefined, when a compute device is to be coupled to the switch 100, the user can actuate the Auto VLAN Time Mode actuator to start a first predefined time period T1. If a compute device is coupled to a port of the switch 100 during that time period T1, the compute device will be configured to operate within the VLAN associated with that time period T1. When the time period T1 has expired, the Auto VLAN Time Mode actuator can be actuated again to start a second time period T2. If a compute device is coupled to a port of the switch 100 during the time period T2, the compute device will be configured to operate within a VLAN associated with the time period T2. In some embodiments, the switch 100 can include a light or lights to signal a user when a time period has started, when a time period is nearing an end of its cycle and/or when a time period has expired. For example, the light or lights can have color indicators, such as green for time started, yellow when nearing an end, and red when the time is expired. Other light signals can alternatively be used, such as, for example, flashing or blinking lights. In some embodiments, audio signals can be used in addition to or alternatively to lights.

Figure 3:
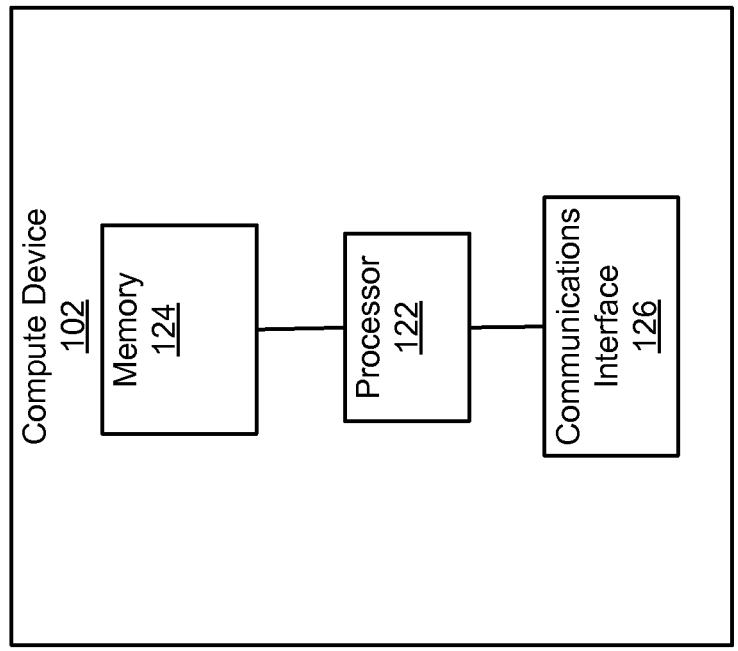
FIG. 3 is a schematic illustration of a compute device, according to an embodiment.

FIG. 3 is a system block diagram of the compute device 102. Compute device 102 includes a processor 122, a memory 124, and a communications interface 126. Processor 122 is operatively coupled to memory 124 and communications interface 126. Compute device 102 can communicate with other compute devices (e.g., compute devices 104, 106, 108), and/or the switch 100 and/or other switch devices (not shown) via communications interface 126. The processor 122 and memory 124 can be the same as or similar to the processor 114 and memory 116 described above. Compute devices 104, 106 and 108 can also include a processor, memory and communications interface as shown and described for compute device 102.

Figures 4, 5:
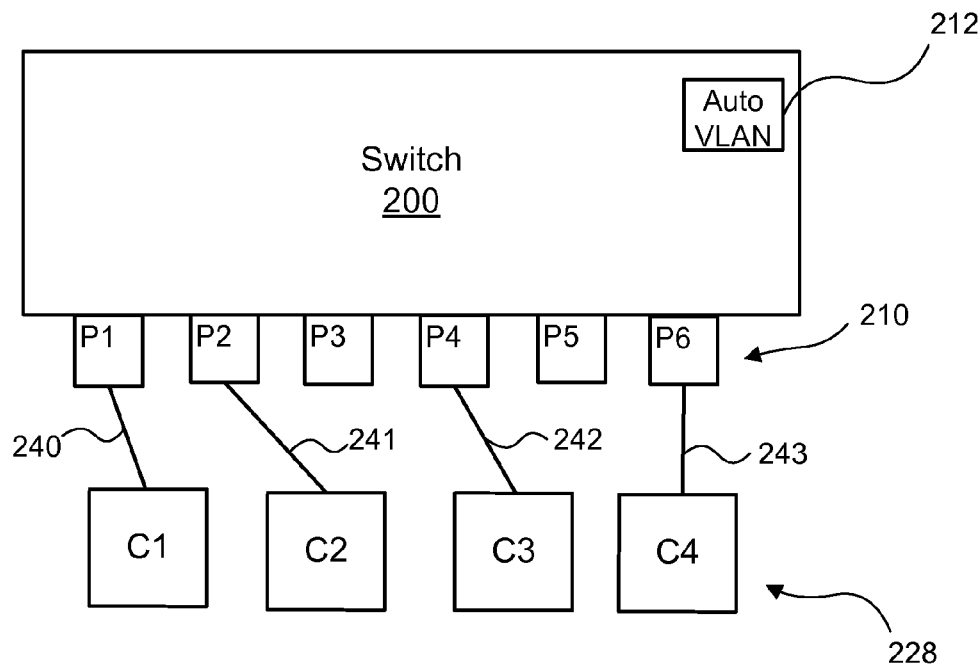
FIG. 4 is a schematic illustration of a switch device according to another embodiment, and multiple compute devices coupled to the switch device.
FIG. 5 is an illustration of a switch configuration table associated with the switch device and compute devices of FIG. 4.

FIG. 4 illustrates a switch 200 according to an embodiment. The switch 200 includes multiple ports 210 (P1, P2, P3, P4, P5, P6) that can be, for example, Ethernet ports that can receive a connector such as, for example, a USB connector. The ports 210 can be identified on the switch 200 in a sequential manner, such that port P1 is directly in sequence preceding port P2, port P2 is directly in sequence preceding port P3, port P3 is directly in sequence preceding port P4, port P4 is directly in sequence preceding port P5 and port P5 is directly in sequence preceding port P6. The switch 200 also includes an Auto VLAN actuator 212 that can be actuated by a user to turn on and off an automatic VLAN configuration mode. When in the Auto VLAN configuration mode, the switch 200 can automatically configure compute devices coupled to a port 210 of the switch 200 to operate within a particular VLAN associated with that port, as described in more detail below.

The switch 200 can be used to operate and control a computing network or system that includes multiple VLANs and can control the operation and/or configuration of the multiple VLANs on multiple compute devices 228, including compute devices C1, C2, C3 and C4. The compute devices C1, C2, C3 and C4 can each be coupled to a selected port 210 (P1, P2, P3, P4, P5, P6) of the switch 200 with, for example, a cable with a connector, such as, a USB connector. As shown in FIG. 4, the compute device C1 is coupled to the port P1 with a cable 240, the compute device C2 is coupled to the port P2 with a cable 241, the compute device C3 is coupled to the port P4 with a cable 242 and the computer device C4 is coupled to the port P6 with a cable 243. The compute devices C1, C2, C3 and C4 can each be, for example, a personal computer, a laptop computer, a personal digital assistant (PDA), a cellular telephone, a portable/mobile internet device and/or some other electronic communications device as described above.

The switch 200 can include a processor, a memory, a communications interface and a configuration module (each not shown) that can each be configured the same as or similar to, and function the same as or similar to the processor 114, memory 116, communications interface 118 and a configuration module 120 described above for switch 100. In this embodiment, the configuration module is configured to automatically configure a compute device to operate within a particular VLAN based on the sequential location of the particular port to which the compute device is coupled in relation to the other ports of the switch 200, and whether a sequentially preceding port of the switch 200 has a compute device coupled thereto.

The configuration module includes or can access a switch configuration table 232, as shown in FIG. 5. FIG. 4 illustrates the switch 200 after the compute devices C1-C4 have been coupled to the switch 200, and FIG. 5 illustrates the switch configuration table 232 after the compute devices C1-C4 have been coupled to the switch 400. Thus, prior to the compute devices C1-C4 being coupled to the switch 200, the switch configuration table 232 has no entries for the Compute Device and VLAN ID columns. As shown in the switch configuration table 232, in this example embodiment, when the compute device C1 is coupled to the port P1, the compute device C1 can be associated with a VLAN identification (ID) VLAN1 that associates the compute device C1 with a first VLAN associated with the VLAN ID VLAN1. The configuration module can send a signal to the compute device C1 such that the compute device C1 is automatically configured to operate within the first VLAN associated with VLAN ID VLAN1, and the computer device C1 and its associated VLAN ID are entered into the switch configuration table 232. When the compute device C2 is coupled to the port P2, VLAN ID VLAN1 is also associated with the compute device C2, and compute device C2 is associated with the first VLAN (the same as for compute device C1) because the port P2 to which the compute device C2 is coupled is directly in sequence after the port P1 (to which compute device C1 is coupled). In other words, no gap exists between the port P1 and the port P2. The configuration module can send a signal to the compute device C2 such that the compute device C2 is automatically configured to operate within the first VLAN (the same as compute device C1), and the compute device C2 and its associated VLAN ID are entered into the switch configuration table 232.

When the compute device C3 is coupled to the port P4, the compute device C3 is associated with and sent a VLAN ID VLAN2 associated with a second VLAN that is different than the first VLAN because the port P3 is directly in sequence preceding the port P4, and the port P3 does not have a compute device coupled thereto (i.e., a one-port gap exists between port P2 and port P4). In other words, the absence of a compute device coupled to the port P3, causes the switch 200 to associate a different VLAN to the compute device C3 coupled to the port P4. The configuration module can send a signal to the compute device C3 such that the compute device C3 is automatically configured to operate within the second VLAN associated with the VLAN ID VLAN2, and the compute device C3 and its associated VLAN ID are entered into the switch configuration table 232. Similarly, when the compute device C4 is coupled to the port P6, the compute device C4 is associated with and sent a VLAN ID VLAN3 associated with a third VLAN that is different than the first VLAN and the second VLAN because the port P6 is directly in sequence after the port P5, and the port P5 does not have a compute device coupled thereto (i.e., there is a one-port gap between port P4 and port P6). The configuration module can send a signal to the compute device C4 such that the compute device C4 is automatically configured to operate within the third VLAN associated with the VLAN ID VLAN3, and the compute device C4 and its associated VLAN ID are entered into the switch configuration table 232.

Figures 6, 7:
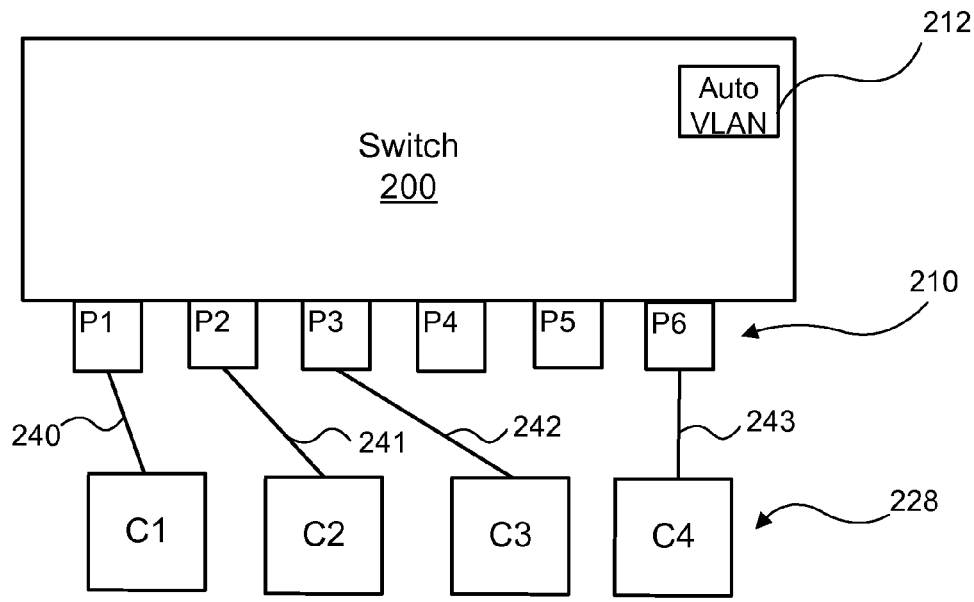
FIG. 6 is a schematic illustration of a switch device according to another embodiment, and multiple compute devices coupled to the switch device.
FIG. 7 is an illustration of a switch configuration table associated with the switch device and compute devices of FIG. 6.

FIG. 6 illustrates the switch 200 and where the compute device C3 has been moved to the port P3. In this example, the compute device C3 can be associated with the VLAN ID VLAN1 because the port P3 is directly in sequence after the port P2. The configuration module can send a signal to the compute device C3 such that the compute device C3 is automatically reconfigured to operate within the first VLAN associated with the VLAN ID VLAN1 as shown in the switch configuration table 232 shown in FIG. 7.

Figures 8, 9:
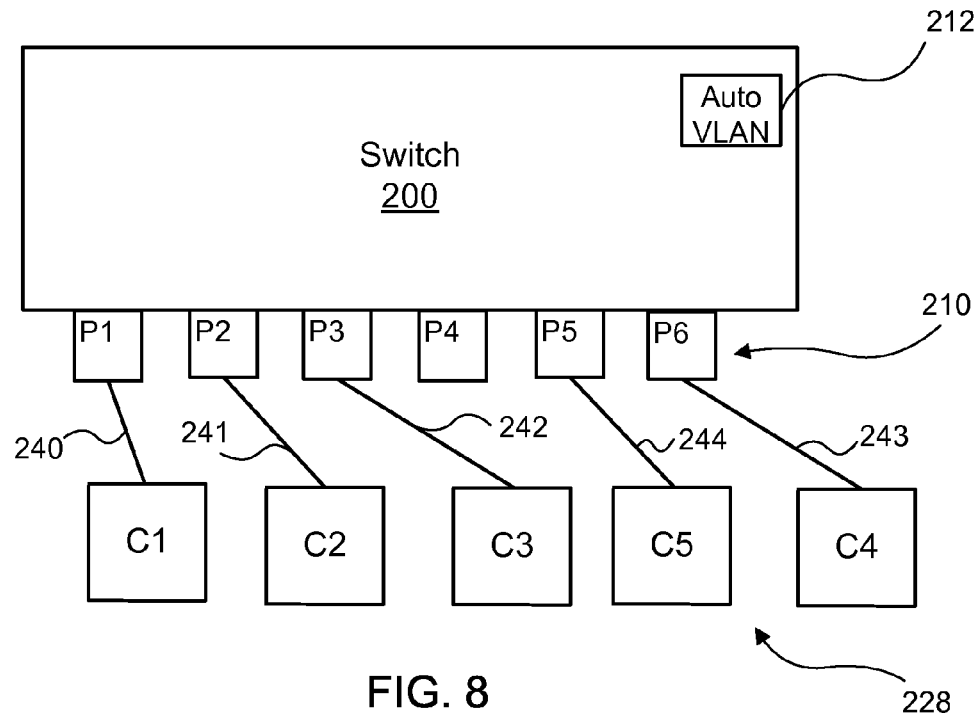
FIG. 8 is a schematic illustration of the switch device of FIG. 6 illustrating an additional compute device coupled to the switch device.
FIG. 9 is an illustration of a switch configuration table associated with the switch device and compute devices of FIG. 8.

FIG. 8 illustrates the switch 220 having a compute device coupled thereto in addition to those shown in FIG. 6. A compute device C5 is coupled to the port P5 of the switch 200 with a cable 244. As shown in the switch configuration table 232 of FIG. 9, the compute devices C1, C2 and C3 are each associated with the VLAN ID VLAN1 and are configured to operate within the first VLAN associated with the VLAN ID VLAN1. When the compute device C5 is coupled to the port P5, the configuration module can associate a VLAN ID VLAN2 with the compute device C5, because port P5 is directly in sequence after the port P4, which does not have a compute device coupled thereto. The configuration module can send a signal to the compute device C5 such that the compute device C5 is automatically configured to operate within the second VLAN associated with the VLAN ID VLAN2. Because the compute device C5 was added or coupled to the switch 200 after the compute device C4 was coupled to port P6 and configured to operate within the third VLAN, the configuration of the compute device C4 is not changed even though the port P6 to which the compute device C4 is coupled is directly in sequence after the port P5. In alternative embodiments, the configuration module can be configured to reconfigure the compute device C4 when the compute device C5 is added to the switch 200. For example, the compute device C4 can be reconfigured to be associated with and operate within the second VLAN (i.e., the same VLAN as the compute device C5 connected to the port P5 directly in sequence before the port P6 to which the compute device C4 is coupled).

Figure 10:
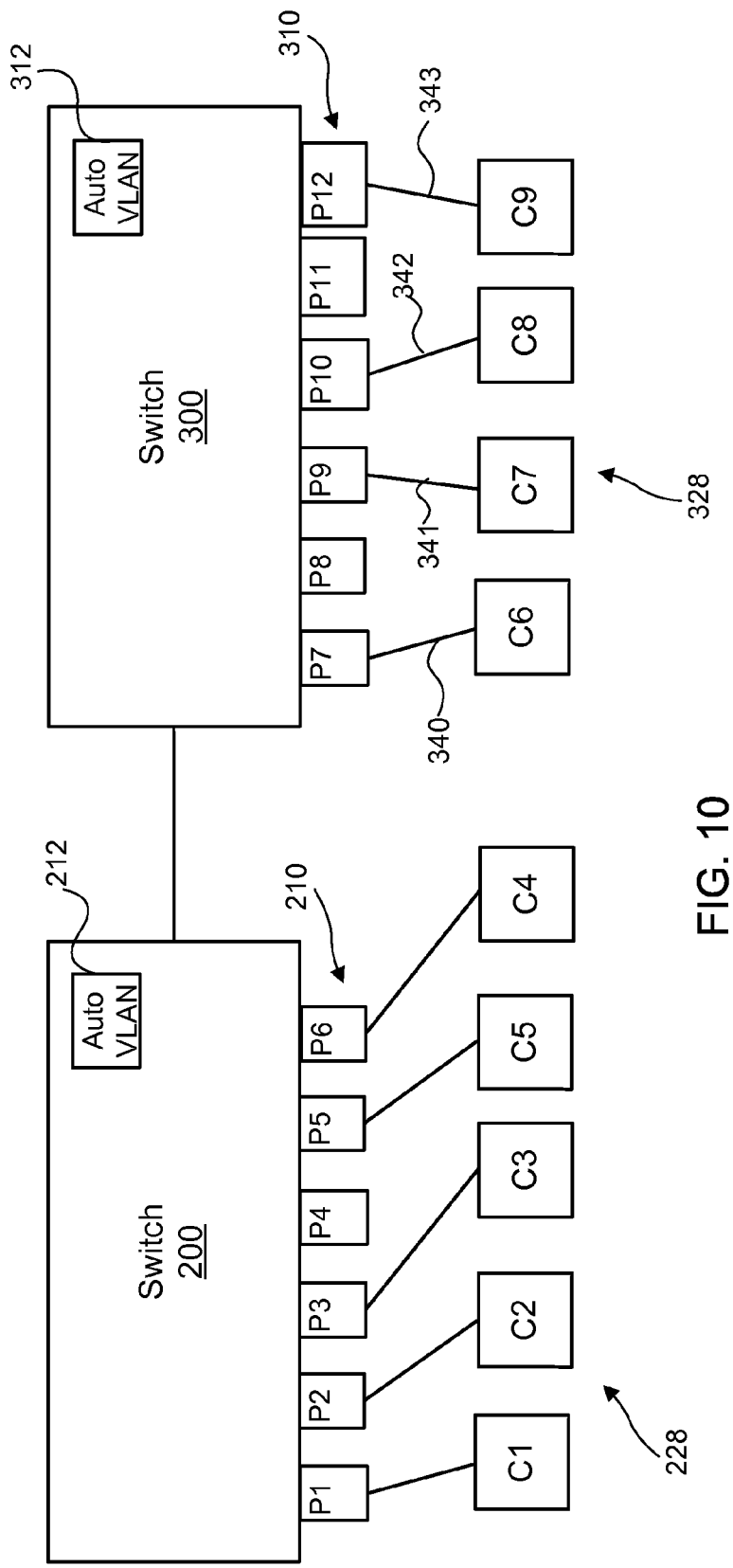
FIG. 10 is an illustration of the switch device and compute devices of FIG. 8 coupled to another switch device coupled to multiple compute devices.

FIG. 10 illustrates an example of the switch 200 operatively coupled to a switch 300. The switch 300 can be used in concert or collectively with the switch 200 to operate and control the computer network or system that includes the switch 200 and the switch 300, and manage the related VLANs in a coordinated manner as described in more detail below. The switch 300 can be configured the same as or similar to the switch 200. For example, the switch 300 can include a processor, a memory, a communications interface and a configuration module (each not shown in FIG. 10) that can each be configured the same as or similar to, and function the same as or similar to the processor 114, memory 116, communications interface 118 and configuration module 120 described above for switch 100. The configuration module of the switch 300 can be configured to automatically configure a compute device to operate within a particular VLAN based on the sequential location of the particular port to which the compute device is coupled in relation to the other ports of the switch 300, and whether a sequentially preceding port of the switch 300 has a compute device coupled thereto, as with switch 200.

The switch 300 includes multiple ports 310 (P7, P8, P9, P10, P11, P12) that can be, for example, Ethernet ports that can receive a connector such as, for example, a connector of a cable having an optical fiber. The ports 310 can be identified on the switch 300 in a sequential manner, such that port P7 is directly in sequence preceding port P8, port P8 is directly in sequence preceding port P9, port P9 is directly in sequence preceding port P10, port P10 is directly in sequence preceding port P11 and port P11 is directly in sequence preceding port P12. The switch 300 also includes an Auto VLAN actuator 312 that can be actuated by a user to turn on and off an automatic VLAN configuration mode. When in the Auto VLAN configuration mode, the switch 300 can automatically configure a compute device 328 coupled to a port 310 of the switch 300 to operate within a particular VLAN associated with that port, in a similar manner as described above for switch 200.

Multiple compute devices 328, including compute devices C6, C7, C8 and C9 are coupled to the switch 300 each at a selected port 310 of the switch 300 with, for example, a cable with a connector, such as, a cable having an optical fiber. As shown in FIG. 10, the compute device C6 is coupled to the port P7 with a cable 340, the compute device C7 is coupled to the port P9 with a cable 341, the compute device C8 is coupled to the port P10 with a cable 342 and the computer device C9 is coupled to the port P12 with a cable 343. The compute devices C6, C7, C8 and C9 can each be, for example, a personal computer, a laptop computer, a personal digital assistant (PDA), a cellular telephone, a portable/mobile internet device and/or some other electronic communications device as described above.

As described above, the switch 200 and the switch 300 are operatively coupled together and can be configured to operate individually (as described above for switch 200) or can be configured to operate in concert collectively or cooperatively with each other such that the ports P1-P6 are in sequence with the ports P7-P12. In other words, ports P1-P6 and ports P7-P12 are collectively treated by switch 200 and switch 300 as a single set of sequentially ordered ports P1-P12 in connection with VLAN configurations. The resulting switch configuration table 332 can consolidate the ports 210 of switch 200 and the ports 310 of switch 300, as shown in FIG. 11. For example, in some embodiments, coordination between the switch 200 and the switch 300 can include identifying or designating one of the switches as a primary switch. For example, the switch 200 can be the primary switch and the switch 300 can communicate information to the switch 200 related to, for example, the ports 310 and the compute device 328 coupled thereto. The configuration module of the switch 200 can configure or access the switch configuration table 332 based on the information communicated from the switch 300, and the switch 200 can communicate to the switch 300 information associated with the switch configuration table 332.

Thus, when a compute device 328 is coupled to a port 310 of the switch 300, the configuration module of the switch 300 can use the switch configuration table 332 to determine which VLAN to associate with that compute device 328. For example, when the compute device C6 is coupled to the port P7, the compute device C6 can be associated with the VLAN ID VLAN3 because the port P6 is directly in sequence preceding the port P7, and the port P6 is associated with the compute device C4 and the third VLAN (i.e., VLAN ID VLAN3). The configuration module of the switch 300 can send a signal to the compute device C6 such that the compute device C6 is automatically configured to operate within the third VLAN associated with the VLAN ID VLAN3 as shown in the switch configuration table 332 illustrated in FIG. 11.

When the compute device C7 is coupled to the port P9, the configuration module of the switch 300 can associate a VLAN ID VLAN4 with the compute device C7, because port P9 is directly in sequence after the port P8, which does not have a compute device coupled thereto. The configuration module of the switch 300 can send a signal to the compute device C7 such that the compute device C7 is automatically configured to operate within a fourth VLAN associated with the VLAN ID VLAN4. When the compute device C8 is coupled to the port P10, the configuration module of the switch 300 can associate a VLAN ID VLAN4 (the same as for compute device C7) with the compute device C8, because port P10 is directly in sequence after the port P9 (to which compute device C7 is coupled), and compute device C7 is associated with the VLAN ID VLAN4 and configured to operate within the fourth VLAN. The configuration module of the switch 300 can send a signal to the compute device C8 such that the compute device C8 is automatically configured to operate within the fourth VLAN. When the compute device C9 is coupled to the port P12, the configuration module of the switch 300 can associate a VLAN ID VLAN5 with the compute device C9 (as shown in FIG. 11), because the port P12 is directly in sequence after the port P11, which does not have a compute device coupled thereto. The configuration module can send a signal to the compute device C9 such that the compute device C9 is automatically configured to operate within a fifth VLAN associated with the VLAN ID VLAN5.

Figures 12, 13:
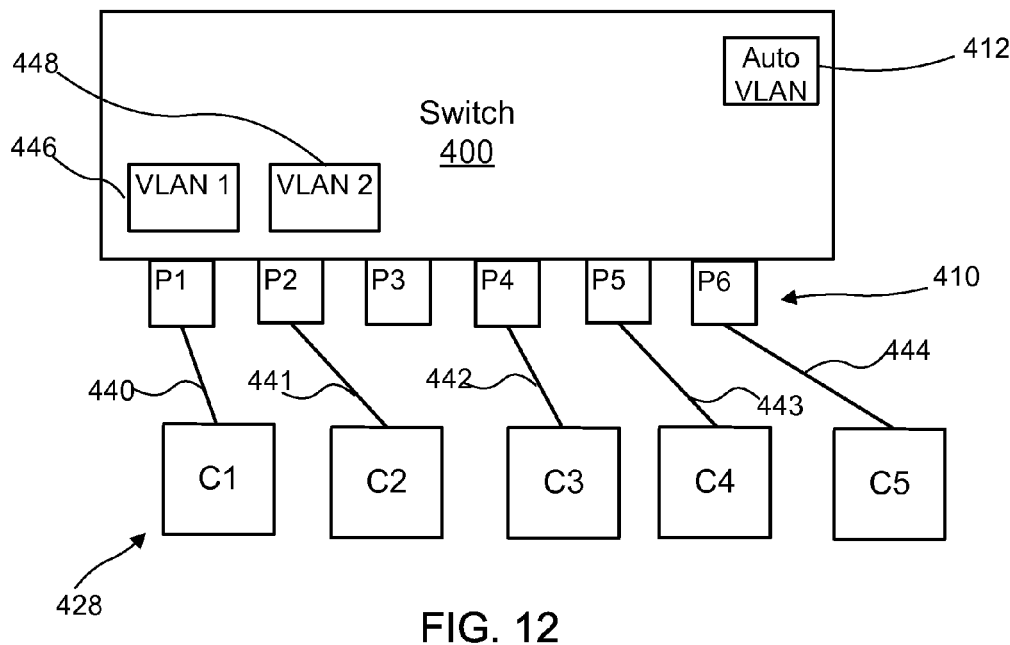
FIG. 12 is an illustration of a switch device according to another embodiment coupled to multiple compute devices.
FIG. 13 is an illustration of a switch configuration table associated with the switch devices and compute devices of FIG. 12.

FIG. 12 illustrates a switch 400 according to another embodiment. The switch 400 includes multiple ports 410 (P1, P2, P3, P4, P5, P6) that can be, for example, Ethernet ports that can receive a connector such as, for example, a connector of a cable having an optical fiber. The switch 400 includes an Auto VLAN actuator 412 that can be actuated by a user to turn on and off an automatic VLAN configuration mode and two VLAN designation actuators 446 and 448. The VLAN designation actuator 446 is associated with a first VLAN of the system and the second VLAN designation actuator 448 is associated with a second VLAN of the system. When in the Auto VLAN configuration mode, the switch 400 can automatically configure compute devices coupled to a port of the switch 400 to operate within either the first VLAN or the second VLAN, as described in more detail below.

The switch 400 can be used to control, configure and operate the first VLAN and the second VLAN and to associate the first VLAN and the second VLAN to multiple compute devices 428, including compute devices C1, C2, C3, C4 and C5. The compute devices C1, C2, C3, C4 and C5 can each be coupled to a selected port 410 (P1, P2, P3, P4, P5, P6) of the switch 400 with, for example, a cable with a connector, such as, a cable having an optical fiber. As shown in FIG. 12, the compute device C1 is coupled to the port P1 with a cable 440, the compute device C2 is coupled to the port P2 with a cable 441, the compute device C3 is coupled to the port P4 with a cable 442, the compute device C4 is coupled to the port P5 with a cable 443 and the compute device C5 is coupled to the port P6 with a cable 444. The compute devices C1, C2, C3, C4 and C5 can each be, for example, a personal computer, a laptop computer, a personal digital assistant (PDA), a cellular telephone, a portable/mobile internet device and/or some other electronic communications device as described above.

The switch 400 can include a processor, a memory, a communications interface and a configuration module (each not shown) that can each be configured the same as or similar to, and function the same as or similar to the processor 114, memory 116, communications interface 118 and a configuration module 120 described above for switch 100. In this embodiment, the configuration module is configured to automatically configure a compute device 410 to operate within a particular VLAN based on which VLAN designation actuator is actuated when the compute device 410 is coupled to a port. The configuration module includes a switch configuration table 432 (as shown in FIG. 13) that associates a VLAN ID with each compute device 428 that is coupled to the switch 400. FIG. 12 illustrates the switch 400 after the compute devices C1-C5 have been coupled to the switch 400, and FIG. 13 illustrates the switch configuration table 432 after the compute devices C1-C5 have been coupled to the switch 400. Prior to the compute devices C1-C5 being coupled to the switch 400, the switch configuration table 432 has no entries for the Compute Device and VLAN ID columns.

In operation, a user can couple a compute device 428 to a port 410 and then actuate (e.g., push) the VLAN designation actuator 446 to automatically configure the compute device 428 to operate within the first VLAN. When the VLAN designation actuator 446 is actuated, the configuration module of the switch 400 can send to the compute device 428 a VLAN ID VLAN1 associated with the first VLAN and a signal to automatically configure the compute device 428 to operate within the first VLAN. An identifier of the particular compute device 428 and its associated VLAN ID VLAN1 are also entered into the switch configuration table 432.

More specifically, in this example embodiment, when the compute device C1 is coupled to the port P1, the VLAN designation actuator 446 is actuated such that the compute device C1 is associated with the VLAN ID VLAN1 that associates the compute device C1 with the first VLAN. The configuration module can send a signal to the compute device C1 such that the compute device C1 is automatically configured to operate within the first VLAN associated with VLAN ID VLAN1. In addition, the compute device C1 and its associated VLAN ID are entered into the switch configuration table 432, as shown in FIG. 13. The compute devices C2 and C5 are similarly configured when connected to the switch 400 and the VLAN designation actuator 446 is actuated. Similarly when the compute device C3 is coupled to the port P4, the VLAN designation actuator 448 can be actuated such that the configuration module associates with the compute device C3 the VLAN ID VLAN2 associated with the second VLAN. The configuration module can send a signal to the compute device C3 such that the compute device C3 is automatically configured to operate within the second VLAN, and the compute device C3 and its associated VLAN ID are entered into the switch configuration table 432, as shown in FIG. 13. The compute device C5 is similarly configured when connected to the switch 400 and the VLAN designation actuator 448 is actuated. Thus, after all the compute devices C1-C5 are coupled to the switch 400, the resulting switch configuration table 432 shown in FIG. 13 will be defined.

Figures 14, 15:
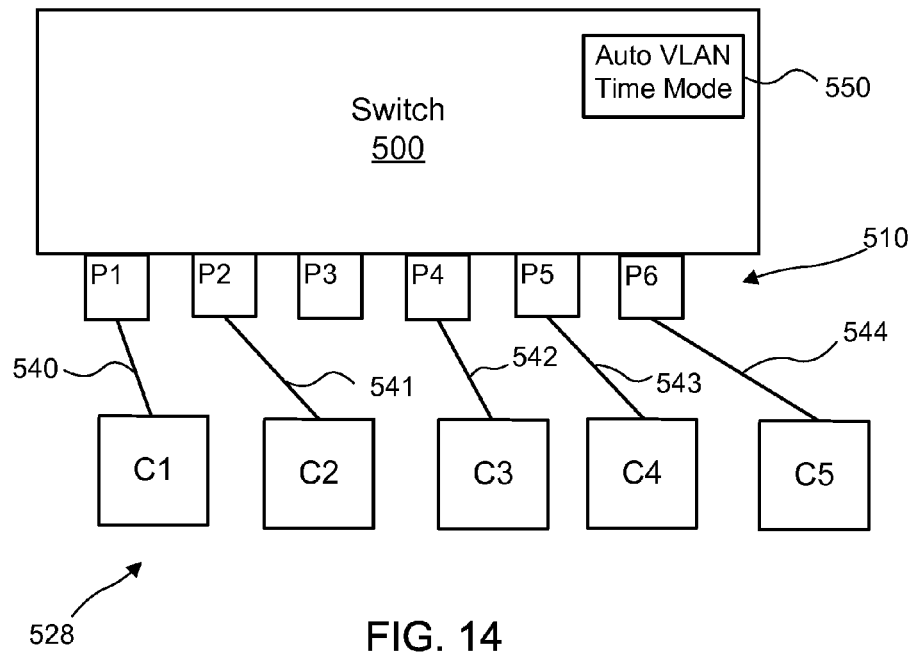
FIG. 14 is an illustration of a switch device according to another embodiment and multiple compute devices coupled to the switch device.
FIG. 15 is an illustration of a switch configuration table associated with the switch device and compute devices of FIG. 14.

FIG. 14 illustrates a switch 500 according to another embodiment. The switch 500 includes multiple ports 510 (P1, P2, P3, P4, P5, P6) that can be, for example, Ethernet ports that can receive a connector such as, for example, a connector of a cable having an optical fiber. The switch 500 includes an Auto VLAN Time Mode actuator 550 that can be actuated by a user to automatically configure a compute device 528 coupled to the switch 500 based on a time period during which the compute device 528 is coupled to the switch 500, as described in more detail below.

The switch 500 can be used in a computer network or system that includes multiple compute devices 528, including compute devices C1, C2, C3, C4 and C5. The compute devices C1, C2, C3, C4 and C5 can each be coupled to a selected port 510 (P1, P2, P3, P4, P5, P6) of the switch 500 with, for example, a cable with a connector, such as, a connector having an optical fiber. As shown in FIG. 14, the compute device C1 is coupled to the port P1 with a cable 540, the compute device C2 is coupled to the port P2 with a cable 541, the compute device C3 is coupled to the port P4 with a cable 542, the compute device C4 is coupled to the port P5 with a cable 543 and the compute device C5 is coupled to the port P6 with a cable 544. The compute devices C1, C2, C3, C4 and C5 can each be, for example, a personal computer, a laptop computer, a personal digital assistant (PDA), a cellular telephone, a portable/mobile internet device and/or some other electronic communications device as described above.

The switch 500 can include a processor, a memory, a communications interface and a configuration module (each not shown) that can each be configured the same as or similar to, and function the same as or similar to the processor 114, memory 116, communications interface 118 and a configuration module 120 described above for switch 100. In this embodiment, the configuration module is configured to automatically configure a compute device 528 to operate within a particular VLAN based on a time period during which a compute device 528 is coupled to a port 510. The configuration module includes a switch configuration table 532 that associates a VLAN ID with each compute device 528 that is coupled to the switch 500, as shown in FIG. 15. FIG. 14 illustrates the switch 500 after the compute devices C1-C5 have been coupled to the switch 500, and FIG. 15 illustrates the switch configuration table 532 after the compute devices C1-C5 have been coupled to the switch 500. Prior to the compute devices C1-C5 being coupled to the switch 500, the switch configuration table 532 has no entries for the Compute Device and VLAN ID columns.

In this embodiment, prior to coupling a compute device 528 to a port 510 of the switch 500, a user can predefine or pre-configure the switch 500, for example, such that a first time period T1 is associated with the first VLAN, and a second time period T2 after the first time period is associated with a second VLAN. Thus, any compute device 528 coupled to a port 510 of the switch 500 during the first time period T1 (i.e., after the Auto VLAN Time Mode actuator 550 has been actuated) will be associated with the first VLAN, and any compute device 528 coupled to a port 510 of the switch 500 during the second time period T2 will be associated with the second VLAN. As discussed above, the switch 500 can include an indicator (not shown) to indicate, for example, when each of the first time period and the second time period has started and/or ended. The indicator can be, for example, an audio and/or visual (e.g., lights) indicator. For example, when the Auto VLAN Time Mode actuator 550 is actuated, the indicator can display a first color light associated with the first time period T1. As the first time period T1 is close to expiring, the indicator light can flash and/or an audio indicator signal can be provided. When the second time period T2 begins, the indicator can display a second color light different than the first color light, and as the second time period is near expiration, the second color light can flash and/or an audio signal can be provided.

In operation, the user can actuate the Auto VLAN Time Mode actuator 550, which will start a first time period T1. During the first time period T1, each compute device 528 that is coupled to a port 510 of the switch 500 will be associated with the VLAN ID VLAN1 that is associated with a first VLAN of the computer network or system. In this example, FIG. 15 illustrates that compute device C1, compute device C4 and compute device C5 have each been coupled to their respective ports P1, P5 and P6 during the first time period T1. Thus, the configuration module will associate compute device C1, compute device C4 and compute device C5 each with the VLAN ID VLAN1 associated with the first VLAN, as shown in FIG. 15. Specifically, the configuration module can send a signal to compute device C1, compute device C4 and compute device C5 such that each of compute device C1, compute device C4 and compute device C5 is automatically configured to operate within the first VLAN associated with VLAN ID VLAN1, and identifiers of the compute devices C1, C4 and C5 and their respective associated VLAN IDs can be entered into the switch configuration table 532.

When the second time period T2 starts, any compute device 528 coupled to a port 510 of the switch 500 will be associated with the second VLAN ID VLAN2 associated with a second VLAN. As shown in FIG. 15, compute device C2 and compute device C3 have each been coupled to their respective ports P2 and P4 during the second time period T2, and therefore, compute device C2 and compute device C3 are each associated with the VLAN ID VLAN2 associated with the second VLAN. The configuration module can send a signal to compute device C2 and compute device C3 such that each of compute device C2 and compute device C3 is automatically configured to operate within the second VLAN associated with VLAN ID VLAN2, and identifiers of the compute devices C2 and C3 and their respective VLAN IDs are entered into the switch configuration table 532 as shown in FIG. 15.

FIG. 16 illustrates a switch configuration table 632 associated with another embodiment of a switch (not shown). In this embodiment, the switch can include a configuration module that is configured to associate one of the VLANs of the system to each of the ports of the switch. For example, the switch can include ports P1-P6 and the configuration module can be configured such that each of the ports P1-P6 is assigned to either a first VLAN associated with a VLAN ID VLAN1 or a second VLAN associated with a VLAN ID VLAN2. In such an embodiment, after the ports P1-P6 of the switch have been associated with a particular VLAN, when a compute device is coupled to a port, the configuration module can send a signal to the compute device to automatically configure the compute device to operate within the VLAN associated with that port. For example, as shown in the switch configuration table 632, the ports P1-P3 and P6 are associated with the VLAN ID VLAN 1, and the ports P4 and P5 are associated with the VLAN ID VLAN2. Thus, if a compute device is coupled to one of ports P1-P3 or P6, the compute device will be automatically configured to operate within the first VLAN associated with the VLAN ID VLAN1. If a compute device is coupled to one of ports P4 or P5, the compute device will be automatically configured to operate within the second VLAN associated with the VLAN ID VLAN2.

Figure 17:
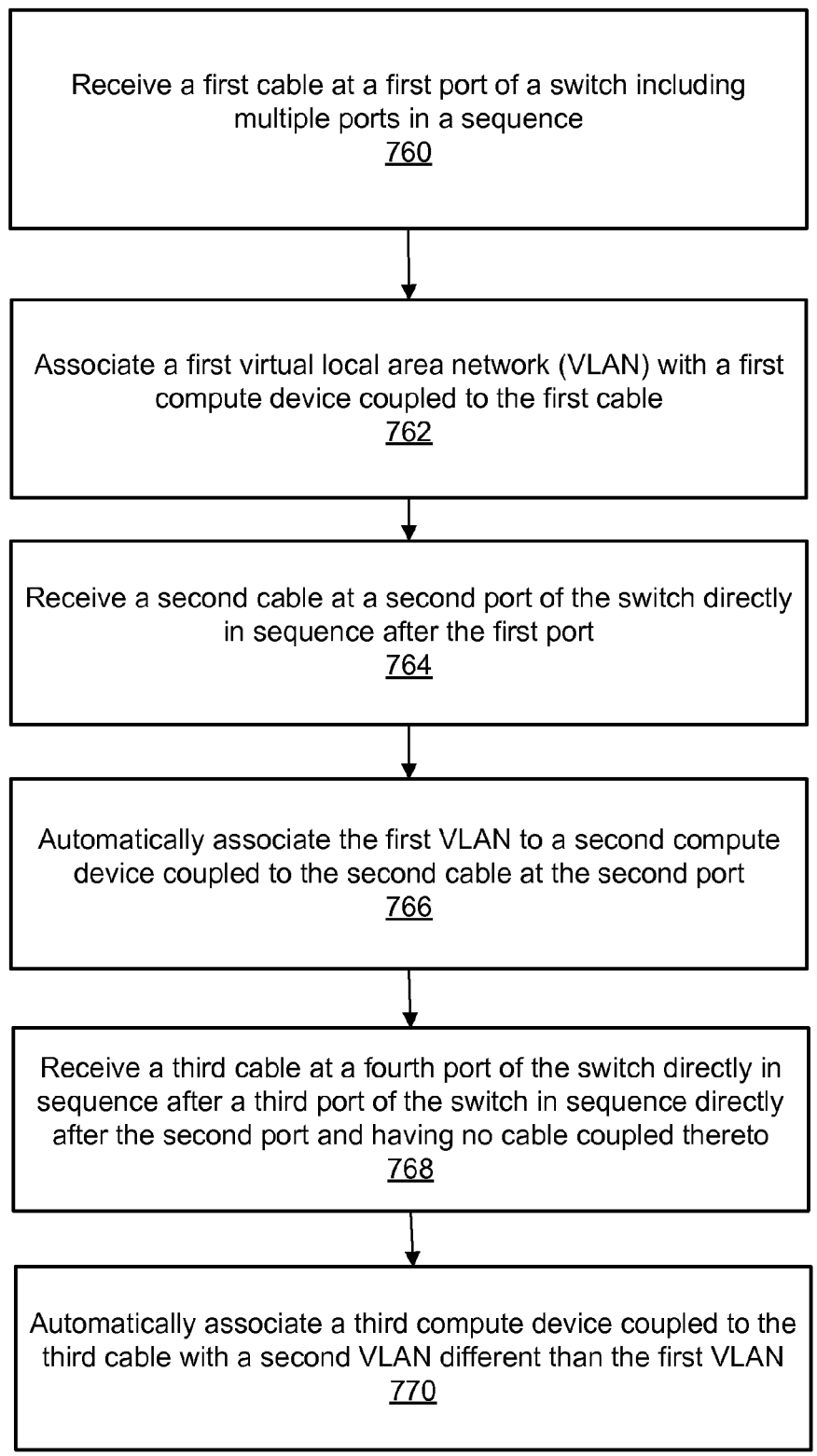
FIG. 17 is a flow chart illustrating a method of automatically configuring a virtual local area network with a compute device coupled to a switch device, according to an embodiment.

FIG. 17 is a flowchart illustrating a method of automatically configuring a compute device coupled to a switch. At 760, a first cable is received at a first port of a switch that includes multiple ports in a sequence. The first cable coupling a first compute device to the switch. At 762, a first VLAN is associated with the first compute device. At 764, a second cable is received at a second port of the switch directly in sequence after the first port. The second cable coupling a second compute device to the switch. At 766, the first VLAN is automatically associated with the second compute device at the second port of the switch based on the second port being directly in sequence after the first port. At 768, a third cable is received at a fourth port of the switch directly in sequence after a third port of the switch that is directly in sequence after the second port and having no cable coupled thereto. The third cable coupling a third compute device to the switch. At 770, the third compute device is automatically associated with a second VLAN that is different than the first VLAN.

Figure 18:
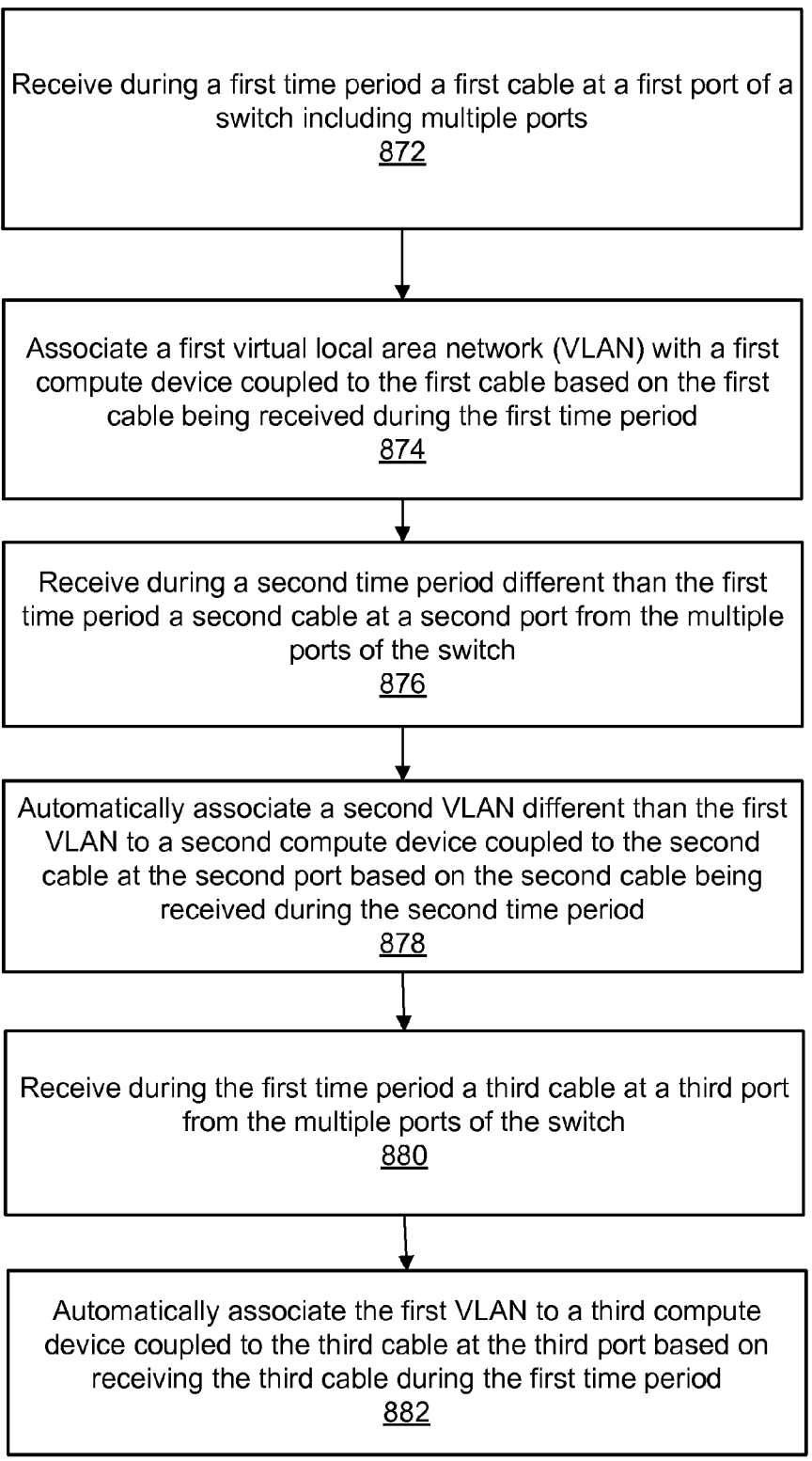
FIG. 18 is a flow chart illustrating another method of automatically configuring a virtual local area network on a compute device coupled to a switch device, according to an embodiment.

FIG. 18 is a flowchart illustrating another method of automatically configuring a compute device coupled to a switch. At 872, a first cable is received during a first time period at a first port of a switch that includes multiple ports. At 874, a first VLAN is associated with a first compute device coupled to the first cable based on the first cable being received during the first time period. At 876, a second cable is received during a second time period different than the first time period at a second port of the switch. At 878, a second VLAN is associated with a second compute device coupled to the second cable at the second port based on the second cable being received during the second time period. At 880, a third cable is received at a third port of the switch during the first time period. At 882, the first VLAN is associated with a third compute device coupled to the third cable at the third port based on the third cable being received during the first time period.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method, comprising:
    receiving at a switch an input from a user to actuate an automatic time mode configuration to start a first pre-set time period, the switch including a plurality of ports including a first port and a second port;
    after receiving the input to actuate the automatic time mode configuration, receiving during the first pre-set time period an indication that a first cable has been received at the first port from the plurality of ports of the switch;
    automatically assigning a first virtual local area network (VLAN) to a first compute device coupled to the first cable based on the first cable being received during the first pre-set time period;
    after automatically assigning the first VLAN, receiving an input from the user to actuate the automatic time mode configuration to start a second pre-set time period, the second pre-set time period being different than the first pre-set time period;
    receiving during the second pre-set time period an indication that a second cable has been received at the second port from the plurality of ports of the switch; and
    automatically assigning a second compute device coupled to the second cable to a second VLAN different than the first VLAN based on the second cable being received during the second pre-set time period.

2. The method of claim 1, comprising:
    receiving during the first pre-set time period a third cable at a third port from the plurality of ports of the switch; and
    automatically assigning the first VLAN with a third compute device coupled to the third cable at the third port based on receiving the third cable during the first pre-set time period.

3. The method of claim 1, further comprising:
    prior to the receiving at the switch the input from the user to actuate the automatic time mode configuration, receiving an input at the switch indicating a selection to place the switch in the automatic time mode configuration; and
    based on the receiving an input, placing the switch in the automatic time mode configuration.

4. The method of claim 1, wherein:
    the automatically assigning the first virtual local area network (VLAN) to the first compute device includes sending from a processor of the switch to the first compute device a signal to automatically assign the first compute device to operate within the first VLAN, and
    the automatically assigning the second virtual local area network (VLAN) to the second compute device includes sending from the processor to the second compute device signal to automatically assign the second compute device to operate within the second VLAN.

5. The method of claim 1, wherein:
    the automatically assigning the first virtual local area network (VLAN) to the first compute device includes sending from a processor of the switch to the first compute device a first VLAN ID associated with the first VLAN, and
    the automatically assigning the second virtual local area network (VLAN) to the second compute device includes sending from the processor to the second compute device a second VLAN ID associated with the second VLAN.

6. The method of claim 1, further comprising:
    receiving during the first pre-set time period a third cable at a third port from the plurality of ports of the switch, the second port being between the first port and the third port; and
    automatically assigning the first VLAN with a third compute device coupled to the third cable at the third port based on receiving the third cable during the first pre-set time period.

7. The method of claim 1, further comprising:
    during the first pre-set time period, actuating a first indicator on the switch to indicate to the user that the first pre-set time period is active; and
    during the second pre-set time period actuating a second indicator different than the first indicator to indicate to the user that the second pre-set time period is active.

8. An apparatus, comprising:
    a switch having a processor and a plurality of ports including a first port and a second port, the processor coupled to a memory, the switch including a user-selectable actuator configured to place the switch in an automatic time mode configuration to start a pre-set time period when actuated,
        the processor configured to automatically assign a first compute device to operate within a first virtual local area network (VLAN) when the first compute device is coupled to the first port with a first cable during a first pre-set time period that is started when a user actuates the user-selectable actuator a first time, the processor configured to automatically assign a second compute device to operate within a second VLAN different than the first VLAN when the second compute device is coupled to the second port with a second cable during a second pre-set time period different than the first pre-set time period that is started when the user actuates the user-selectable actuator a second time.

9. The apparatus of claim 8, wherein the processor of the switch is configured to assign a third compute device to first VLAN when the third compute device is coupled to a third port from the plurality of ports with a third cable during the first pre-set time period.

10. The apparatus of claim 8, wherein:
    the processor is configured to send a signal to the first compute device to automatically assign the first compute device to operate within the first VLAN when the first compute device is coupled to the first port, and
    the processor is configured to send a signal to the second compute device to automatically assign the second compute device to operate within the second VLAN when the second compute device is coupled to the second port.

11. The apparatus of claim 8, wherein:
when the first compute device is automatically assigned to operate within the first VLAN, the processor is configured to send to the first compute device a first VLAN ID associated with the first VLAN, and
when the second compute device is automatically assigned to operate within the second VLAN, the processor is configured to send to the second compute device a second VLAN ID associated with the second VLAN.

12. The apparatus of claim 8, further comprising:
an indicator on the switch configured to indicate to the user when the first pre-set time period is active and when the second pre-set time period is active.

13. A non-transitory processor-readable medium storing code representing instructions to be executed by a processor, the code comprising code to cause the processor to:
receive at a switch an input from a user to actuate an automatic time mode configuration to start a first pre-set time period, the switch including a plurality of ports including a first port and a second port;
after receiving the input to actuate the automatic time mode configuration to start the first pre-set time period, receive an indication of a first cable coupled at a first port of a switch during the first pre-set time period;
automatically send to a memory a signal representing an assignment of a first virtual local area network (VLAN) with a first compute device coupled to the first cable based on the first cable being coupled to the first port during the first pre-set time period such that the assignment is stored in the memory;
after automatically assigning the first VLAN, receive an input from the user to start a second pre-set time period, the second pre-set time period being different than the first pre-set time period;
receive an indication of a second cable coupled at the second port of the switch during the second pre-set time period; and
automatically send to the memory a signal representing an assignment of a second VLAN with a second compute device coupled to the second cable at the second port, based on the second cable being coupled to the second port during the second pre-set time period such that the assignment is stored in the memory.

14. The non-transitory processor-readable medium of claim 13, further comprising code to cause the processor to:
receive an indication of a third cable coupled at a third port from the plurality of ports of the switch during the first pre-set time period; and
automatically send to the memory a signal representing an assignment of the first VLAN to a third compute device coupled to the third cable based on the third cable being coupled to the third port during the first pre-set time period such that the assignment is stored in the memory.

15. The non-transitory processor-readable medium of claim 13, wherein:
the code to automatically send to the memory a signal representing an assignment of the first VLAN to the first compute device includes code to send to the first compute device a first VLAN ID associated with the first VLAN, and
the code to automatically send to the memory a signal representing an assignment of the second VLAN to the second compute device includes code to send to the second compute device a second VLAN ID associated with the second VLAN.

16. The non-transitory processor-readable medium of claim 13, wherein:
the code to automatically send to the memory a signal representing an assignment of the first VLAN to the first compute device includes code to send from the switch to the first compute device a signal to automatically assign the first compute device to operate within the first VLAN, and
the code to automatically send to the memory a signal representing an assignment of the second VLAN to the second compute device includes code to send from the switch to the second compute device a signal to automatically assign the second compute device to operate within the second VLAN.

17. The non-transitory processor-readable medium of claim 13, further comprising code to:
prior to the receiving an indication of a first cable coupled to the first port, receive an input indicating a selection to place the switch in the automatic time mode configuration; and
based on the input, send a signal to cause the switch to be placed in the automatic time mode configuration.

18. The non-transitory processor-readable medium of claim 13, further comprising code to:
prior to the first pre-set time period,
receive an input to define the first pre-set time period and associate the first pre-set time period with the first VLAN, and
receive an input to define the second pre-set time period and to associate the second pre-set time period with the second VLAN.

19. The non-transitory processor-readable medium of claim 13, further comprising code to:
during the first pre-set time period, actuate a first indicator on the switch to indicate to the user that the first pre-set time period is active; and
during the second pre-set time period actuate a second indicator different than the first indicator to indicate to the user that the second pre-set time period is active.

20. The method of claim 1, further comprising:
prior to the receiving at the switch the input from the user to actuate the automatic time mode configuration, receiving at the switch an input to define the first pre-set time period and associate the first pre-set time period with the first VLAN; and
receiving at the switch an input to define the second pre-set time period and associate the second pre-set time period with the second VLAN.

* * * * *